(12) United States Patent
Stenvall et al.

(10) Patent No.: US 12,738,814 B2
(45) Date of Patent: Sep. 15, 2026

(54) ROTOR, AN ELECTRIC MOTOR AND AN ELECTRIC VEHICLE

(71) Applicant: Polestar Performance AB, Gothenburg (SE)

(72) Inventors: Lars Stenvall, Ljungskile (SE); Per Strandemo, Sävedalen (SE)

(73) Assignee: POLESTAR PERFORMANCE AB, Gothenburg (SE)

(*) Notice: Subject to any disclaimer, the term of this patent is extended or adjusted under 35 U.S.C. 154(b) by 113 days.

(21) Appl. No.: 18/598,726

(22) Filed: Mar. 7, 2024

(65) Prior Publication Data

US 2024/0356414 A1 Oct. 24, 2024

(30) Foreign Application Priority Data

Apr. 24, 2023 (EP) .................................... 23169618

(51) Int. Cl.

| | |
|---|---|
| ***H02K 11/042*** | (2016.01) |
| ***H02K 1/32*** | (2006.01) |
| ***H02K 7/08*** | (2006.01) |

(52) U.S. Cl.

CPC ............. *H02K 11/042* (2013.01); *H02K 1/32* (2013.01); *H02K 7/083* (2013.01); *H02K 2203/09* (2013.01)

(58) Field of Classification Search

CPC ........ H02K 11/042; H02K 1/32; H02K 7/083; H02K 2203/09

USPC ........................................ 310/68 D, 179, 195

See application file for complete search history.

(56) References Cited

U.S. PATENT DOCUMENTS 5,587,616 A * 12/1996 Johnsen ................. H02K 19/36 310/68 D
2022/0060088 A1 2/2022 Maier et al.

FOREIGN PATENT DOCUMENTS

DE 102021212012 B3 * 4/2023 ............... H02K 1/32

OTHER PUBLICATIONS

Application No. EP23169618.8 , Extended European Search Report, Mailed on Oct. 2, 2023, 8 pages.

* cited by examiner

*Primary Examiner* — Jose A Gonzalez Quinones
(74) *Attorney, Agent, or Firm* — Kilpatrick Townsend & Stockton LLP

(57) ABSTRACT

The present disclosure relates to a rotor for being accommodated by a stator of an electric motor comprising a hollow rotor shaft and an annular rotor core comprising a winding, the annular rotor core accommodating the hollow rotor shaft. Further, the rotor comprises a power transmitting arrangement comprising a receiving device configured to receive AC power and rectify said AC power to DC power. Further, the rotor comprises coil busbars. Furthermore, the receiving device is positioned at an interior of said hollow rotor shaft.

15 Claims, 6 Drawing Sheets

ROTOR, AN ELECTRIC MOTOR AND AN ELECTRIC VEHICLE

CROSS-REFERENCES TO RELATED APPLICATIONS

This application claims priority to European patent application Ser. No. EP23169618.8, filed Apr. 24, 2023, the contents of which are incorporated herein by reference in its entirety.

TECHNICAL FIELD

The present disclosure relates to a rotor comprising a hollow rotor shaft, an annular rotor core and a power transmitting arrangement having a receiving device positioned at an interior of said hollow rotor shaft. Further, the disclosure relates to an electric motor comprising such a rotor and a vehicle comprising such a rotor.

BACKGROUND

Electric vehicles (EV) are becoming increasingly popular as consumers look to decrease their environmental impact and improve air quality.

In an electric vehicle the rotor and stator are key components of the electric motor that drives the vehicle's wheels. The rotor is the rotating part of the motor, typically made of a series of electromagnets, which are energized by electrical current. As the rotor spins, its magnetic field interacts with the stator. The stator is the stationary part of the motor, typically consisting of a windings wound around a core. The rotor and stator work together to convert electrical energy stored in the EV's battery into mechanical energy to drive the vehicle, making them critical components of the EV powertrain.

Permanent magnets used in rotors are not considered environmentally friendly for several reasons. First, the production of permanent magnets involves mining and refining of rare earth elements, which can cause environmental degradation and pollution. Also, permanent magnets can pose challenges in recycling and disposal, as they contain hazardous materials that can potentially harm the environment if not handled properly. Therefore, while permanent magnets have many technological benefits, their production and use can have negative environmental implications that need to be carefully managed.

Based on the above, electrically excited rotors using windings around the rotor core are considered to be more environmental friendly compared to permanent magnet rotors. However, the use of an electrically excited rotor requires electronic circuitry and other components which in turn can lead to a more bulky rotor. Therefore, even though an electrically excited rotor is preferable in terms of environmental impact, its implementation makes the motor more bulky compared to a motor having a rotor with permanent magnets.

Thus, there is room for electrically excited rotors in the present art to explore the domain of providing an electrically excited rotor that is improved in terms of compactness. Thus, even though previous solutions may work well in some situations, it would be desirable to provide an electrically excited rotor that address requirements related to improving a compactness thereof.

SUMMARY

It is therefore an object of the present disclosure to alleviate at least some of the mentioned drawbacks to provide a rotor that is improved in compactness. Further, the disclosure provides an electric motor comprising such a rotor and a vehicle comprising such a rotor.

The present disclosure relates to a rotor for being accommodated by a stator of an electric motor. The rotor comprising a hollow annular rotor shaft, an annular rotor core comprising a winding, the annular rotor core accommodating/circumferentially enclosing the hollow rotor shaft. Further, the rotor comprises a power transmitting arrangement for transferring power from a power source to said winding, the power transmitting arrangement comprising a receiving device configured to receive, inductively/contactless, alternating current, AC, power from said power source; and rectify said AC power to DC power. Further, the rotor comprises (e.g. a pair of) coil busbars, each being connected, at one end, to said receiving device and, at another end to said winding. Further, the receiving device is positioned at an interior (within/on the inside) of said hollow rotor shaft.

The term "rotor" herein may refer to an electrically excited rotor. An electrically excited rotor being a rotor that is magnetized by an external electrical source.

An advantage of the rotor herein is that it is improved in compactness while also having a lower weight compared to conventional rotors. Further, it is improved in space efficiency. This is specifically achieved by the hollow rotor having the transmitting arrangement arranged therein.

Further, in some aspects, the power transmitting arrangement may comprise a transmitting device configured to receive AC power from said power source; and inductively/contactless transmit said AC power to said receiving device. The transmitting device may be stationary relative the rotor so that upon rotation of the rotor, the transmitting device is stationary.

The inductive power transfer of the transmitting device to the receiving device of the power transmitting arrangement may be realized by a receiving coil arrangement at the receiving device a transmitting coil arrangement at the transmitting device, thereby providing inductive/contactless power transfer from the transmitting device to the receiving device.

An advantage of this is that it provides an environmental friendly, yet light-weight and compact power transferring means to/magnetize the rotor.

At least a part of the transmitting device may be positioned at an interior of said hollow rotor shaft.

An advantage of this is that it allows for further improved compactness.

In some aspects, the transmitting device is coaxially/concentrically aligned with said receiving device for radial power transfer. In other words, the receiving device may enclose the transmitting device or vice versa.

The rotor may comprise a cooling nozzle arranged to provide cooling medium into said hollow rotor shaft. Accordingly, the rotor and electronic circuitry therein (e.g. receiving device) may be directly cooled.

In one aspect, the cooling nozzle extends axially through a center portion of said transmitting and (at least a part of) receiving devices.

An advantage of this is maintained compactness while providing rotor cooling as the cooling nozzle is enclosed by at least part of both the transmitting and receiving device. The rotor shaft may comprise perforations/openings that allow the cooling medium from the nozzle to be distributed to the exterior of the rotor and also cool the rotor windings and rotor core.

In some aspects herein, the cooling nozzle is directed towards at least a part of the receiving device so that an axial extension of said cooling nozzle intersects with at least a part of said receiving device, thereby allowing the nozzle to inject cooling medium directly at a part of said receiving device. In other words, the cooling nozzle may face part of the receiving device. Part of the receiving device may refer to a rectifier circuitry thereof. Accordingly, the nozzle may be directed through the centre of the (along coaxial center axis of the receiving and transmitting devices) power transmitting arrangement and face the rectifier circuitry that e.g. is located at a printed circuit board (PCB). In other words, the nozzle may be directed towards the top surface of the PCB.

The rotor may further comprise bearing arrangements (such as ball bearings roller bearings or any other suitable type of bearings) configured to allow the rotor to rotate relative a stator accommodating said rotor and relative the housing of the electric machine. At least one of the bearing arrangements may be attached to an interior surface of said hollow rotor shaft. The bearing arrangement may have an inner ring, an outer ring and a rolling element. The bearing arrangement attached to the interior surface of said rotor may have its outer ring fixed to the interior surface of the rotor shaft and the outer ring being arranged to be fixed to an electric motor housing. The electric motor housing enclosing the stator and the rotor.

An advantage of this is further compactness without any compromising of function of the rotor.

The coil busbars may extend from said receiving device at said interior out from an outer base portion of the hollow rotor shaft. The coil busbars may refer to at least two busbars, one connected to a "+" terminal of the (output of) rectifier circuitry and one to a "−" terminal of the rectifier circuitry. Accordingly, the input of the rectifier circuitry receives AC current.

The rotor may further comprises a cup of dielectric enclosing the receiving device and at least a part of the transmitting device. The cup of dielectric material may be for example a plastic material. The cup of dielectric allow for electrically shielding the receiving device and the transmitting device from the rotor shaft. The cup of dielectric may comprise perforations.

The receiving device may comprise a receiving coil arrangement and a rectifier circuitry connected to said receiving coil arrangement. Further, the coil busbars may, at said one end, be connected to said rectifier circuitry, and said another end be connected to said winding. In other words, the coil busbars may extend from the rectifier circuitry to the winding such that the converted DC current can be supplied to the rotor windings for simulating a permanent magnetic field by said winding.

In some aspects, the rectifier circuitry is attached to a base portion of said hollow rotor shaft, wherein preferably, the receiving coil arrangement is located at an opposing other base portion of said hollow rotor shaft. Then, the rectifier circuitry may be connected to the receiving coil arrangement or circuitry thereof by rectifier busbars. An advantage of such a configuration is that the rectifier circuitry may be supported (or even attached to, e.g. by fixing means) by the base of the rotor shaft.

The present disclosure further relates to an electric motor for a vehicle comprising a stator and a rotor according to any aspect herein, wherein the stator accommodates the rotor. The stator may be accommodated by an electric motor housing.

There is also provided an electric vehicle comprising the electric motor according to any one of the aspects herein.

BRIEF DESCRIPTION OF THE DRAWINGS

These and other features and advantages of the present disclosure will now be further clarified and described in more detail, with reference to the appended drawings.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the present disclosure, it will be apparent to one skilled in the art that the present disclosure may be practiced without these specific details. In other instances, well known constructions or functions are not described in detail, so as not to obscure the present disclosure.

The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

The term "hollow rotor shaft" may refer to that the rotor shaft comprises a void/space at the interior of the rotor shaft. The rotor shaft may at one end be connected to an output shaft of an EV.

Figure 1:
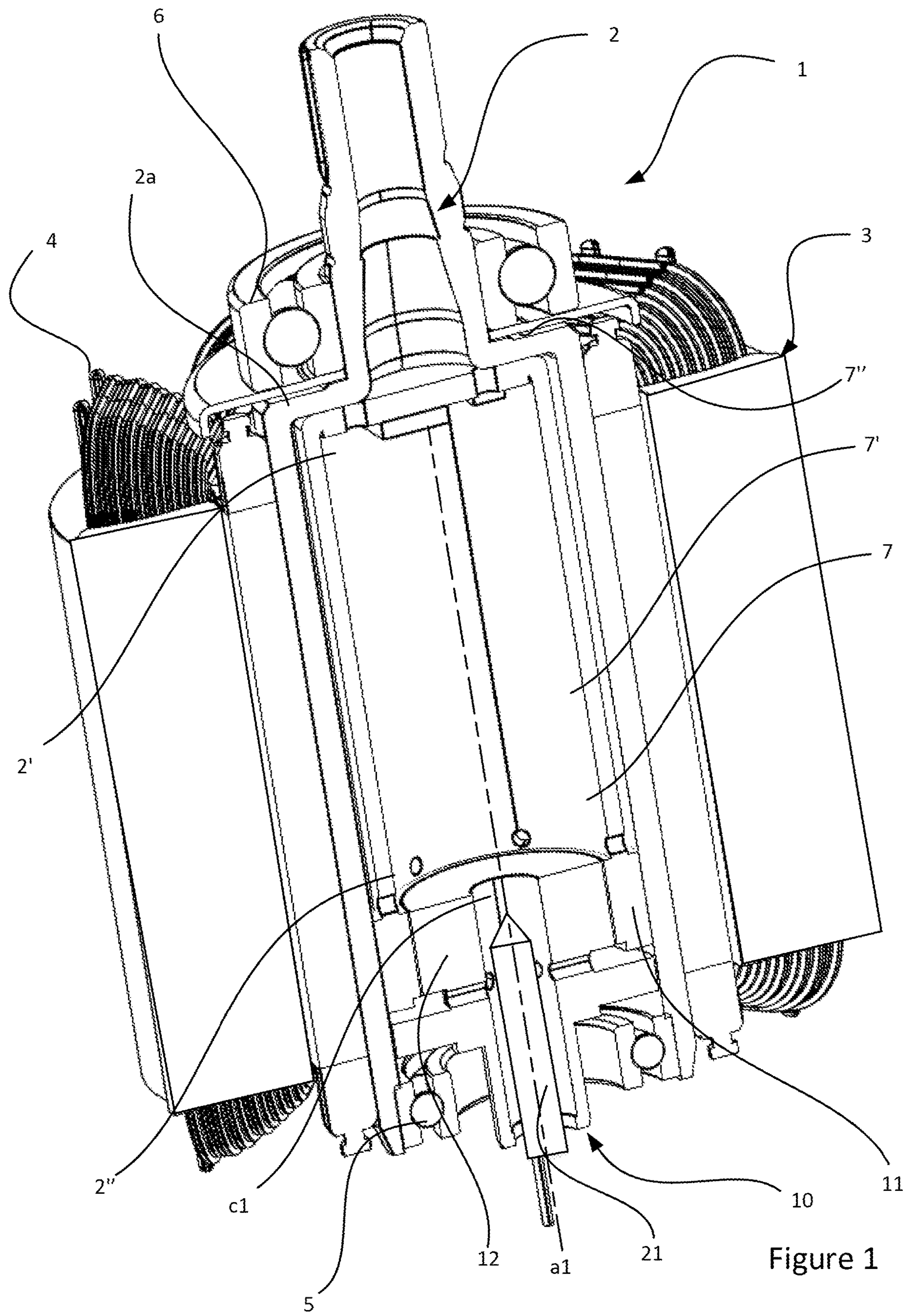
FIG. 1 illustrates an objective cross-sectional view of a rotor shaft 1 in accordance with some aspects herein.

FIG. 1 illustrates an objective cross sectional view of a rotor 1 in accordance with some aspects of the present disclosure. FIG. 1 illustrates that the rotor 1 comprises a hollow rotor shaft 2, an annular rotor core 3 comprising a winding 4. The annular rotor core 3 accommodating the hollow rotor shaft 2.

Further, FIG. 1 illustrates that the rotor 1 comprises a power transmitting arrangement 10 for transferring power from a power source (e.g. a battery module of an EV, the battery module being connected to power electronics thereof such as an inverter) to said winding 4. The power transmitting arrangement 10 comprises a receiving device 11 configured to receive, inductively, AC power from said power source; and rectify said AC power to DC power. Further, the rotor 1 comprises coil busbars, each being connected, at one end, to said receiving device and, at another end to said winding. The coil busbars are not illustrated in FIG. 1 but are illustrated in e.g. FIG. 2 Further, FIG. 1 illustrates that the receiving device 11 is positioned at an interior of said hollow rotor shaft 2 so that the rotor shaft 2 completely encloses the receiving device 11. In other words, the receiving device may be attached to the interior surface 7' of the rotor shaft 2 such that the interior surface 7' encloses the receiving device 11 radially/circumferentially i.e. in a direction perpendicular to the axial extension of the shaft 2. It should be noted that the surface 7' may also enclose at least a part of the transmitting device 12 radially. In some aspects the transmitting device is fully enclosed radially by the surface 7'.

The winding 4 of the rotor is arranged to receive DC power so to provide/simulate a permanent magnetic field arranged to interact with windings of a stator to allow the rotor to rotate relative the stator. Accordingly, the rotor 1 is arranged to be accommodated by a stator. The windings may be formed by any conductive material such as copper. The rotor shaft may be formed by steel, cast iron or any other suitable rotor shaft material.

FIG. 1 further illustrates that the transmitting device 12 may be coaxially aligned with said receiving device 11 for radial power transfer. Accordingly, the AC power is transferred/transmitted from the transmitting device 12 to the receiving device 11 radially. FIG. 1 illustrates an aspect of the shapes of the transmitting 12 and receiving 11 devices in which the devices are annularly formed and the receiving device 11 encloses the transmitting device 12 radially.

The power transmitting arrangement 11 may further comprise rotation monitoring device (not shown) for measuring degrees of rotation of the rotor. The rotation monitoring device may be a resolver or a position sensor. The resolver may be arranged to be enclosed within the interior 7 of the rotor 1.

FIG. 1 further illustrates that the rotor 1 may comprise a cooling nozzle 21 arranged to provide cooling medium into said hollow rotor shaft 2. The cooling nozzle 21 in FIG. 1 extends axially through a centre portion cl of said annular transmitting and receiving devices 12, 11. The interior surface 7' of the rotor shaft 2 may comprise holes/perforations for allowing the cooling medium to be distributed to the rotor core 3. Accordingly, the cooling nozzle 21 may cool the interior 7 of the rotor shaft 2 as well as the windings 4 of the rotor 1.

FIG. 1 further illustrates that the rotor 1 comprises bearing arrangements 5, 6 configured to allow the rotor 1 to rotate relative a stator and a housing (not shown). The bearings 5, 6 allow for smooth rotation that reduces friction and wear between the rotor shaft 2 and the housing. FIG. 1 illustrates that one of the bearing arrangements 5 is attached to an interior surface 7' of said hollow rotor shaft 2. The other bearing arrangement 6 is at an opposing side of the first bearing arrangement 5 which attached to the interior surface 7' of the rotor 1. The other bearing arrangement 6 is attached to an outer surface of the rotor shaft 2 in FIG. 1. The bearing arrangements 5, 6 may each circumferentially cover annular surfaces of the shaft 2, wherein the first bearing arrangement 5 covers an interior surface of the shaft 2 and the second bearing arrangement 6 covers an exterior surface of the shaft 2.

Figure 2:
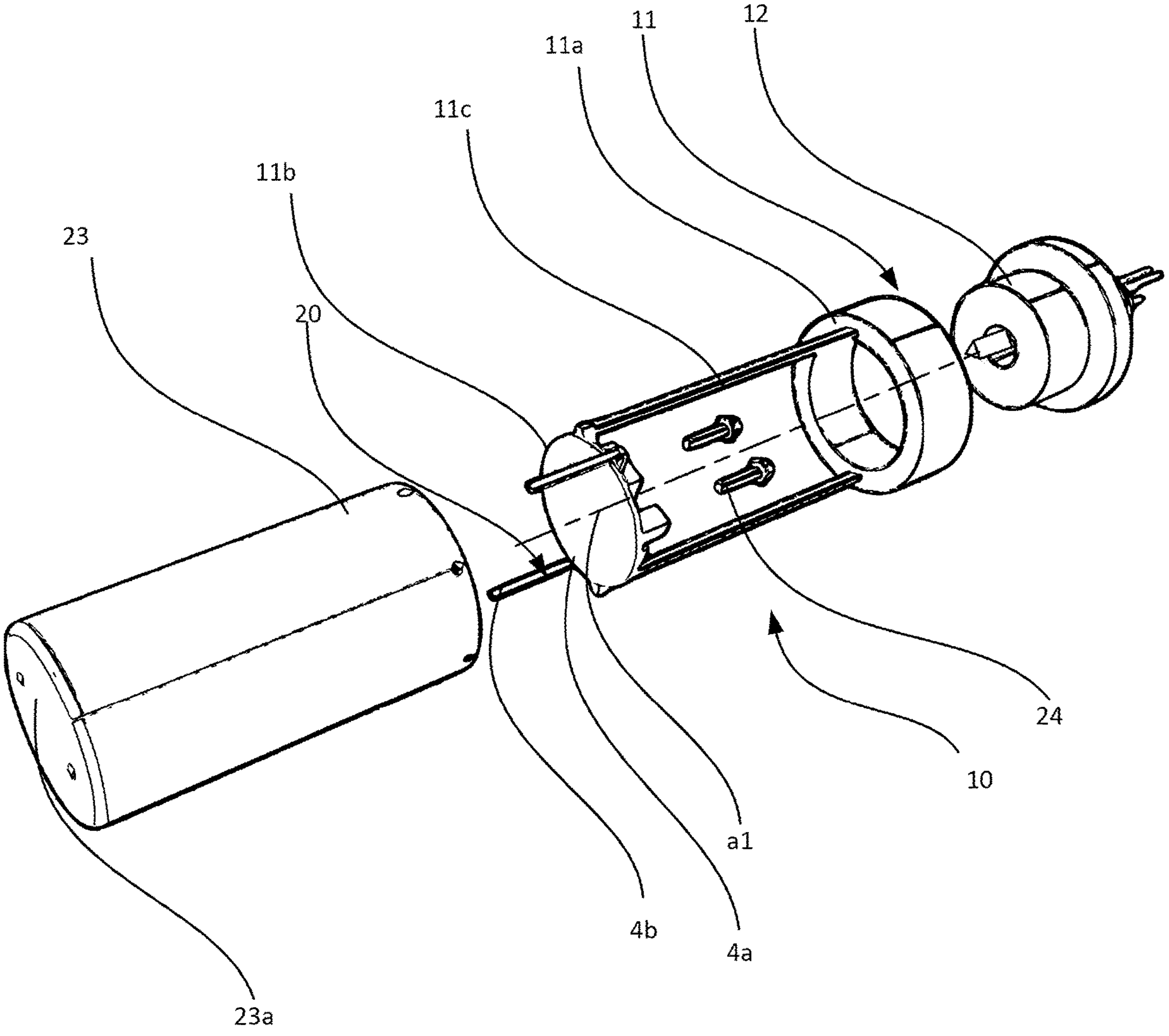
FIG. 2 illustrates an objective exploded view of a power transmitting arrangement 10 in accordance with some aspects herein.

The coil busbars 20 (which are shown in FIG. 2) may extend from said receiving device 11 at said interior 7 out from an outer surface 7" of the hollow rotor shaft 2.

FIG. 2 illustrates an exploded objective view of a power transmitting arrangement 10. The power transmitting arrangement 10 is arranged within the rotor 1 in FIG. 1.

FIG. 2 illustrates that the power transmitting arrangement 10 comprises a receiving device 11 and a transmitting device 12. The transmitting device 12 being configured to receive AC power from said power source and inductively transmit said AC power to said receiving device 11. Further, the transmitting device 12 is stationary relative the rotor so that upon rotation of the rotor, the transmitting device is stationary.

The receiving device 11 may comprise a receiving coil arrangement and the transmitting device 12 may comprise a transmitting coil arrangement for inductive power transfer from the transmitting device 12 to the receiving device 11. In other words, the transmitting device 12 is, in such an aspect, arranged to receive AC current from a power source (e.g. the inverter of an EV) and contactless/inductively transmit said AC current to the receiving device 11.

FIG. 2 further illustrates schematically that the receiving device 11 comprises a receiving coil arrangement **11*a* and a rectifier circuitry 11*b* connected to said receiving coil arrangement 11*a*, wherein said coil busbars 20 are, at said one end 4*a*, connected to said rectifier circuitry 11*b*, and arranged to at said another end 4*b* be connected to said winding 4**.

Referring back to FIG. 1, FIG. 1 illustrates that a rectifier circuitry **11*b* may be attached to a (first) base portion 2' of said hollow rotor shaft 2. Then preferably, the receiving coil arrangement 11*a* is located at an opposing other (second) base portion 2" of said hollow rotor shaft 2. In other words, the receiving coil arrangement 11*a* and the rectifier circuitry 11*b* may be located at opposing inner end portions of the rotor shaft 2. Then, rectifier busbars 11*c* may connect the receiving coil arrangement 11*a* to the rectifier circuitry 11*b*. The rectifier busbars are illustrated in FIG. 2. The first base portion may be referred to as a first end portion and the second base portion 2" may be referred to as a second end portion. Accordingly, the base portions 2', 2" jointly define the length of the rotor shaft axially. The second base portion 2" may comprise an open end. The open end may allow the transmitting device 12 to be within the interior 7 of the rotor shaft 2 while being stationary relative the rotor shaft 2 when the rotor 1 is excited. The power transmitting arrangement 10 may as shown in FIG. 1 close/cover at least a part of the open end (e.g. 50-95% of said open end) such that they form a lid for the open end of the rotor shaft 2. The open end may also allow for the components of the power transmitting arrangement 10 to be inserted into the hollow rotor shaft 2**.

FIG. 2 further illustrates that the rotor 1 may comprise a cup of dielectric 23 enclosing the receiving device 11 and at least a part of the transmitting device 12. Specifically, the cup of dielectric 23 may support the power transmitting arrangement 10. Thus, the receiving device 11 may be arranged into said cup of dielectric 23. The busbars 20 may then protrude out of a base **23*a* of said cup of dielectric. The rectifier circuitry 11*b* may be attached to said base 23*a* so that the base provides a support surface for said rectifier circuitry 11*b***.

Referring to FIG. 2, it should be noted that the transmitting device 12, when attached inside the cup of dielectric 23 may not contact the cup of dielectric 23 so that the transmitting device 12 is able to be stationary. Thereby transmitting device 12 may be arranged to provide contactless power transfer to said receiving device 11.

The rectifier circuitry **11*b*** may comprise a substrate in which electronic components thereof are attached to. The substrate may be a printed circuit board.

FIG. 2 further illustrates that the cooling nozzle 21 may be directed rectifier circuitry **11*b* so that an axial extension al of said cooling nozzle 21 intersects with at least a part of said rectifier circuitry 11*b* thereby allowing the nozzle 21 to directly cool said (electronic components of said) rectifier circuitry 11***b*. The cup of dielectric 23 may further comprise perforations/openings so that the cooling medium can be distributed to the exterior of said cup 23 and said rotor shaft 2. FIG. 2 further illustrates that the rectifier circuitry 11*b* and/or the cup of dielectric 23 may be attached to the interior surface 7' of the rotor shaft 2 by means of fixing means 24 (e.g. bolts or nuts). Accordingly, the fixing means may penetrate the rectifier circuitry 11*b*, the base 23*a* and a surface 7' of the rotor shaft 2.

Figures 3A, 3B:
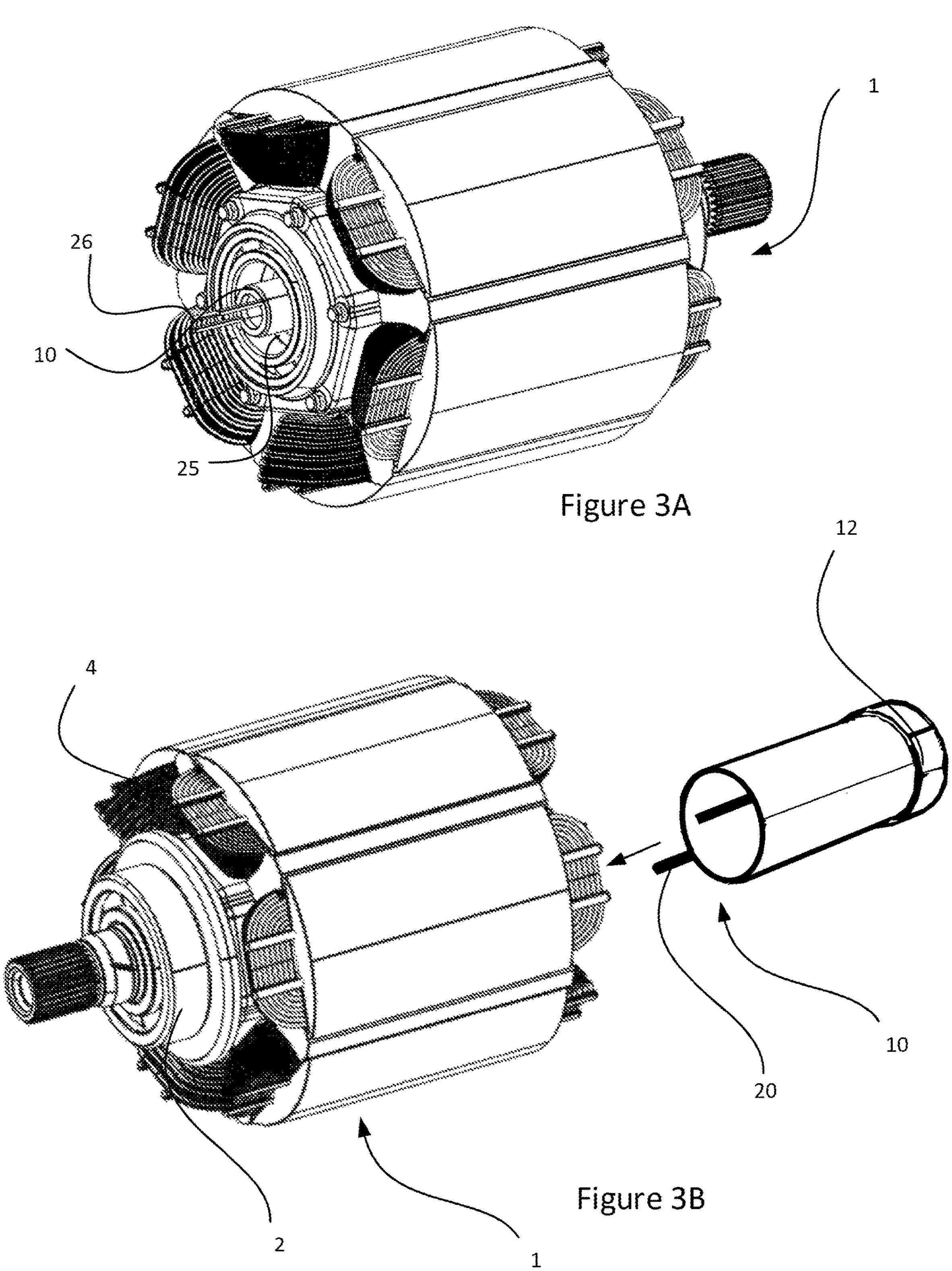
FIG. 3A illustrates an objective back view of a rotor shaft 1 in accordance with aspects herein.
FIG. 3B illustrates an objective front view of a rotor shaft 1 in accordance with aspects herein.

FIG. 3A illustrates an objective back view of the rotor 1 in accordance with any aspect herein. FIG. 3A illustrates a the open end 25 of the rotor shaft 2 with at least a part of the power transmitting arrangement 10 located therein. Preferably, the receiving and transmitting coils are circumferentially/radially enclosed by the shaft 2. FIG. 3A further illustrates that the power transmitting arrangement 10 (specifically the stationary transmitting device) may be connected to wires 26. Wires 26 being for providing the AC current to the transmitting device from a power source. There may also be additional wires for providing power to e.g. a resolver device. The wires may be routed to the rotor 1 through a routing channel in the electric motor housing (not shown). The housing may be in the form of a frame supporting the stator and rotor 1.

FIG. 3B illustrates an objective front view of the rotor 1 in accordance with any aspect herein. FIG. 3B illustrates that the cup of dielectric 23 with circuitry therein (busbars 20 shown) are arranged to be inserted into said hollow rotor shaft. Then, the busbars 20 may protrude out of the rotor shaft 2 and contact the windings 4. Accordingly, at least a part of the busbars 20 are positioned at the interior of the hollow rotor shaft 2.

Figure 4:
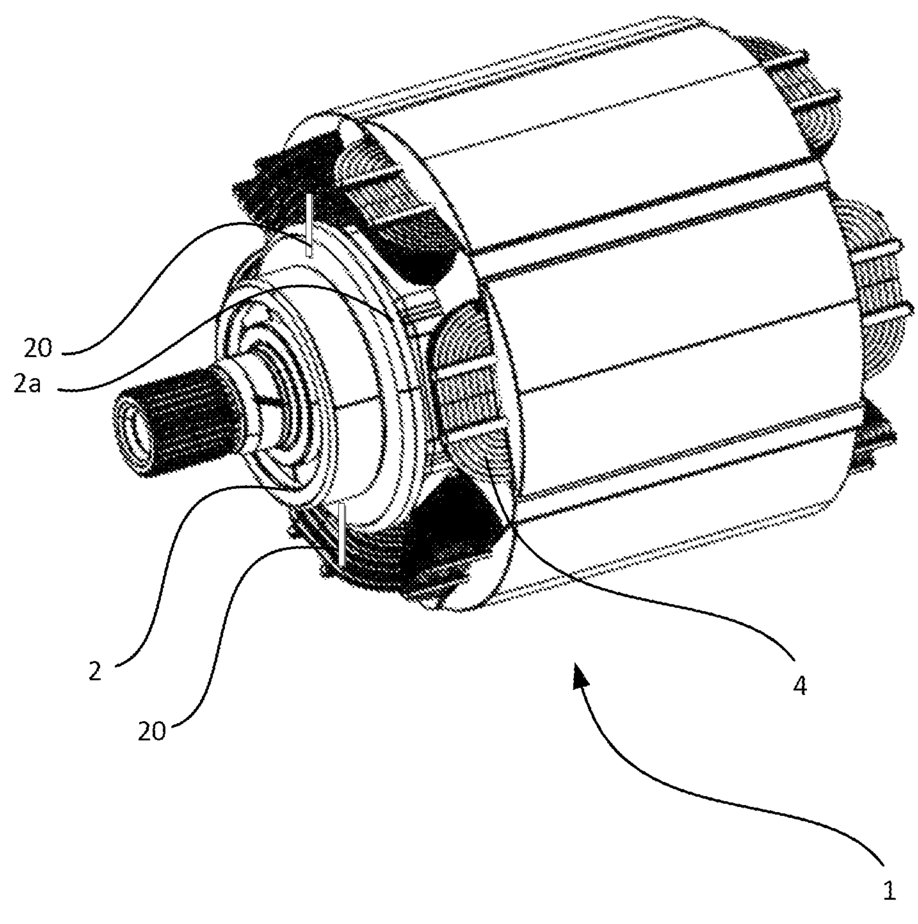
FIG. 4 illustrates an objective front view of a rotor shaft 1 in accordance with aspects herein, specifically showing coil busbars 20 protruding out from said shaft 1.

FIG. 4 illustrates an objective view of the rotor 1 in accordance with some aspects herein. FIG. 4 illustrates that the busbars 20 extend/protrude out from the surface 2*a* of the rotor shaft 2 to contact the winding 4 of the rotor 2 so to supply the winding 4 with DC current so to electrically excite the winding 4 to provide a magnetic field. The winding pattern of the rotor is not limited to any specific pattern and could be varied within the knowledge of the skilled person in the art.

Figure 5:
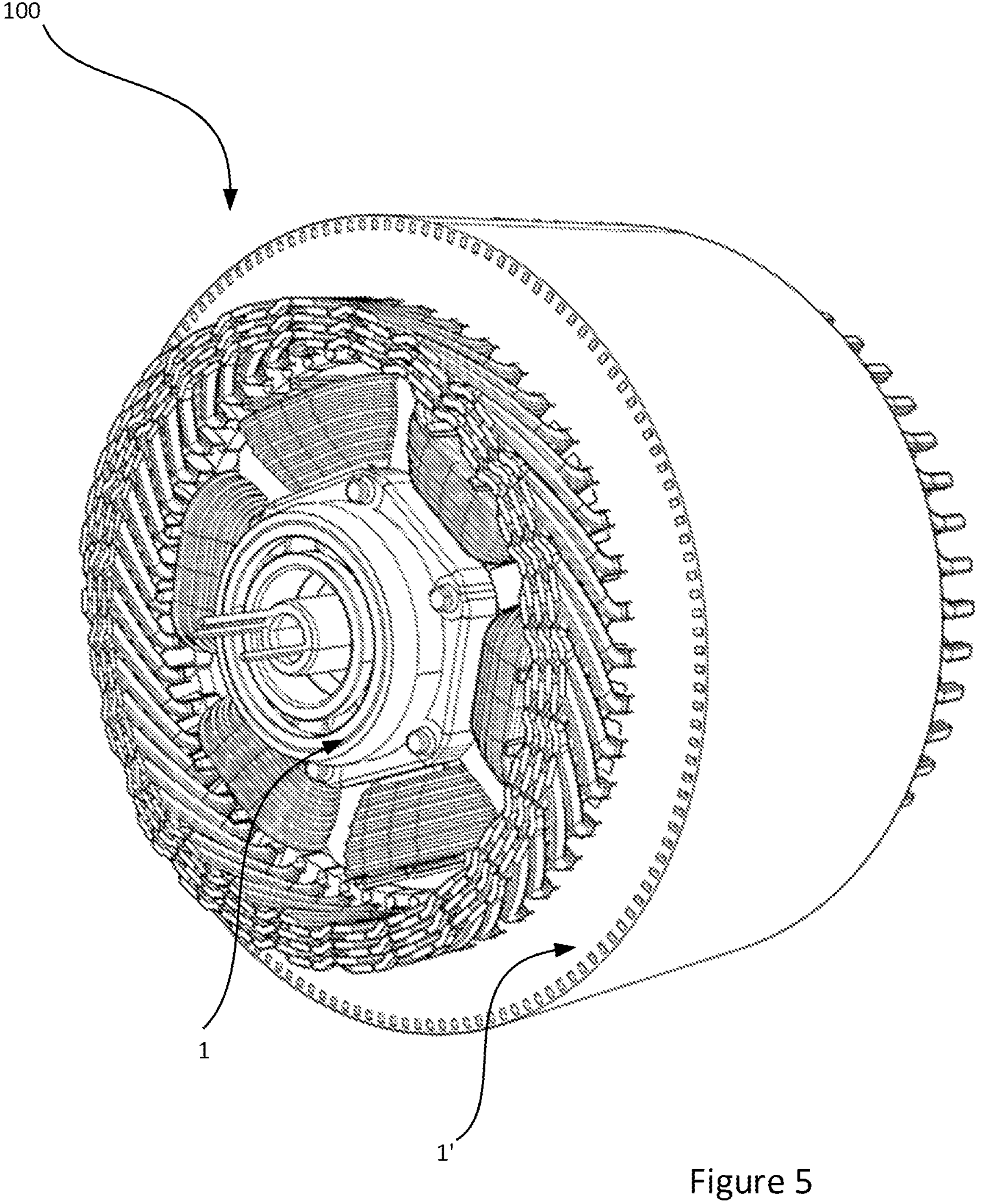
FIG. 5 illustrates an objective back view of an electric motor 100 in accordance with aspects herein.

FIG. 5 illustrates an objective view of an electric motor 100 comprising the rotor 1 according to any aspect herein. Further, FIG. 5 illustrates that the rotor 1 is enclosed by a stator 1'. Accordingly, upon electrically exciting the rotor 1, the stator 1' rotor 1 interaction allow for the rotor 1 to rotate relative the stator 1'.

Figure 6:
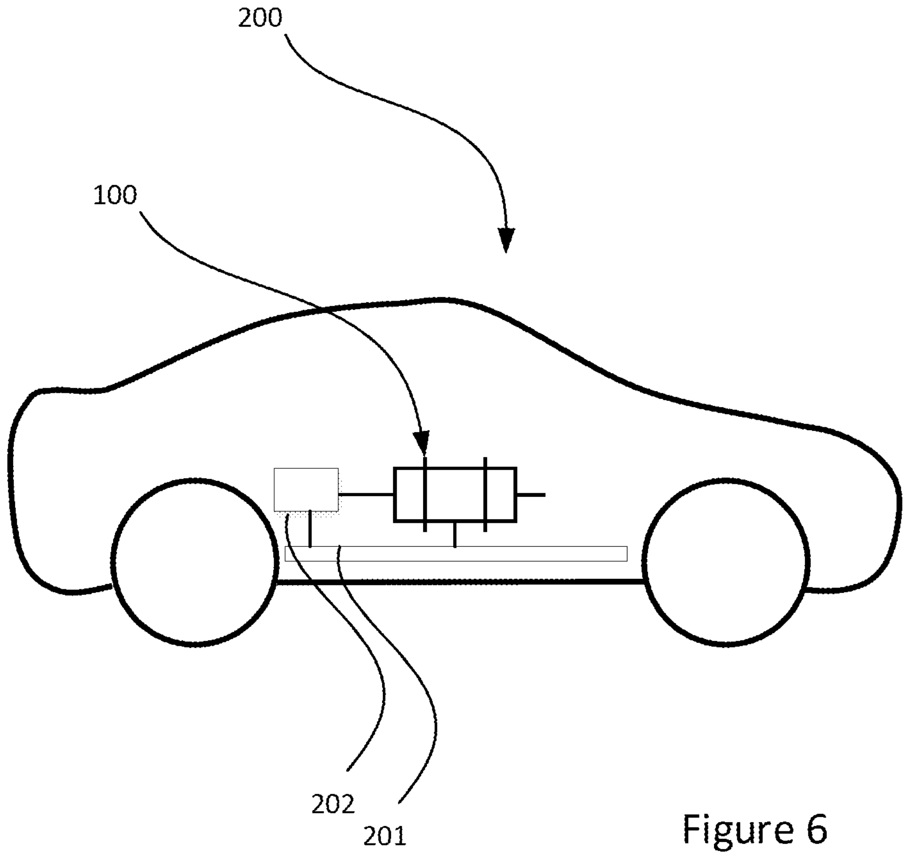
FIG. 6 schematically illustrates an electric vehicle 200 in accordance with aspects herein.

FIG. 6 schematically illustrates an electric vehicle 200 comprising an electric motor 100 having the rotor 1 in accordance with any aspect herein. The electric vehicle 200 comprises a battery module 201 a number of other electrical components, including an electrical current transmission system, safety system, battery management system, current management system, and a battery busbar interconnecting the various components. Further, the electric vehicle 200 may comprise an electronic control unit (ECU) 202 in order to control the electric motor 100, in some The ECU 202 or components thereof can comprise or include various modules, each of which is constructed, programmed, configured, or otherwise adapted to autonomously carry out a function or set of functions.

The invention claimed is:

1. A rotor for being accommodated by a stator of an electric motor comprising:

a hollow rotor shaft;

an annular rotor core comprising a winding, the annular rotor core accommodating the hollow rotor shaft;

a power transmitting arrangement) for transferring power from a power source to said winding, the power transmitting arrangement comprising a receiving device configured to:

receive, inductively, AC power from said power source; and rectify said AC power to DC power;

coil busbars, each being connected, at one end, to said receiving device and, at another end to said winding, wherein:

the receiving device is positioned at an interior of said hollow rotor shaft;

the receiving device comprises a receiving coil arrangement and a rectifier circuitry connected to said receiving coil arrangement;

said coil busbars are, at said one end, connected to said rectifier circuitry, and said another end connected to said winding;

the rectifier circuitry is attached to a base portion of said hollow rotor shaft such that the rectifier circuitry is supported or attached to the base of the hollow rotor shaft;

the receiving coil arrangement is located at an opposing other base portion of said hollow rotor shaft; and the rectifier circuitry is connected to the receiving coil arrangement by rectifier busbars.

2. The rotor according to claim 1, wherein the power transmitting arrangement further comprises a transmitting device configured to:

receive AC power from said power source; and inductively transmit said AC power to said receiving device;

wherein the transmitting device is stationary relative the rotor so that upon rotation of the rotor, the transmitting device is stationary.

3. The rotor according to claim 1, wherein the receiving device comprises a receiving coil arrangement and the power transmitting arrangement further comprises a transmitting device comprising a transmitting coil arrangement for inductive power transfer from the transmitting device to the receiving device.

4. The rotor according to claim 2, wherein at least a part of the transmitting device is positioned at an interior of said hollow rotor shaft.

5. The rotor according to claim 2, wherein the transmitting device is coaxially aligned with said receiving device for radial power transfer.

6. The rotor according to claim 2, wherein the rotor comprises a cooling nozzle arranged to provide cooling medium into said hollow rotor shaft.

7. The rotor according to claim 6, wherein the cooling nozzle extends axially through a centre portion of said transmitting and receiving devices.

8. The rotor according to claim 6, wherein the cooling nozzle is directed towards at least a part of the receiving device so that an axial extension of said cooling nozzle intersects with at least a part of said receiving device thereby allowing the cooling nozzle to inject cooling medium directly at a part of said receiving device.

9. The rotor according to claim 1, wherein the rotor comprises bearing arrangements configured to allow the rotor to rotate relative the stator accommodating said rotor, wherein at least one of the bearing arrangements is attached to an interior surface of said hollow rotor shaft.

10. The rotor according to claim 1, wherein said coil busbars extend from said receiving device at said interior out from an outer base portion of the hollow rotor shaft.

11. The rotor according to claim 2, wherein the rotor comprises a cup of dielectric enclosing the receiving device and at least a part of the transmitting device.

12. The rotor according to claim 1, wherein the rectifier circuitry is attached to said base portion by fixing means.

13. The rotor according to claim 12, wherein the fixing means penetrates the rectifier circuitry and an interior surface of the hollow rotor shaft.

14. The electric motor for a vehicle comprising:

a stator; and a rotor according to claim 1, the stator accommodating the rotor.

15. An electric vehicle comprising the electric motor according to claim 1.

* * * * *